United States Patent Office

2,801,178
Patented July 30, 1957

2,801,178

PECTINIC ACID COMPOSITION AND METHOD OF MAKING THE SAME

Herbert T. Leo and Clarence C. Taylor, Anaheim, Calif.

No Drawing. Application October 23, 1956,
Serial No. 617,698

16 Claims. (Cl. 99—132)

This invention relates to a minimum methoxyl pectinic acid and to methods of making the same and to compositions and products made therewith.

The present application constitutes a continuation-in-part of our application Serial No. 485,579, filed February 1, 1955. In that application, we have disclosed and claimed a method of preparing a minimum methoxyl pectinic acid by the action of a citrus-peel-derived enzyme, pectase, carried to completion, on a high methoxyl pectin, also derived from citrus peel, in the form of a pectin-aluminum co-precipitate. We have found that a citrus pectin in other forms, such as a pectin concentrate made by evaporating an acid aqueous extract of pectin from citrus peel until it has a pectin content of from 2% to 4% by weight, and also a finished high methoxyl pectin, likewise derived from citrus peel, and preferably of about 30 mesh particle size, or coarser, can be similarly subjected to the action of pectase derived from citrus peel to produce a minimum methoxyl pectinic acid in all respects similar to that obtained from the pectin-aluminum coprecipitate. There are, then, these three sources of pectin for conversion by enzymic action into our minimum methoxyl pectinic acid.

It has been known for sometime that low methoxyl pectinic acid could be made from pectin by either acid or alkaline hydrolysis of the pectin, or by the action of enzymes on the pectin. In the case of acid or alkaline hydrolysis of pectin, the demethylation can be carried so far as to produce a completely demethylated end product, which is termed pectic acid and which is incapable of forming jelly with sugar and acid. Furthermore, owing to the degrading effect on pectin of strong alkalis or acids, there is a tendency to degrade the product whenever acids or alkalis are used. This seems to be true even where caustic alkalis are used solely for the purpose of maintaining the proper pH conditions, generally between 6 and 7, in the carrying out of an enzymic demethylation reaction. In addition, the use of caustic alkalis or even alkali metal carbonates in an enzymic demethylation step renders the resulting pectinic acid difficult to wash and to filter.

In the Herbert T. Leo Patent No. 1,513,615, one of us described a method of treating fruit pulp in the absence of acids with a separately derived enzyme pectase, and of thereafter precipitating and recovering a "pectous" product. Such a product would now be recognized as a demethylated pectin, or pectinic acid, probably in the form of its calcium salt, due to the use of calcium carbonate for neutralizing any acid present. Any multi-valent ions, such as calcium, would, in the process of that patent be precipitated out as inorganic salts along with the "calcium pectate" in the subsequent alcohol treatment. Thus, the product of Patent No. 1,513,615 would be in a very impure state and would be unsuited for use in the manner intended for the product of our present invention.

A more recent patent of ours, Patent No. 2,540,050, described the method of preparing a low methoxyl pectinic acid by the action of enzymes upon a pectin-aluminum complex, obtained as a co-precipitate upon the addition of aluminum ions to a pectin solution under proper pH conditions. Although the method so described was entirely satisfactory for the production of a low methoxyl pectinic acid, the patentees failed to recognize that in order to obtain a minimum methoxyl pectinic acid of particular desirable properties, the enzymic action had to be carried to completion and the resulting pectinic acid had to be isolated and recovered substantially entirely free from multi-valent metals.

The present invention, therefore, is directed to an improvement over that described and claimed in the last mentioned patent. We have found that the enzymic action upon the pectin content of the pectin source material should be carried out to completion under pH conditions of between 6 and 7 maintained solely and continuously throughout the entire period of enzymic action by an excess of calcium carbonate, or precipitated chalk, or of magnesium carbonate. The completion of such enzymic action is indicated when there is no longer any tendency for the pH of the reaction mass to drop numerically, that is, for the acidity to increase. At this point, the pectin has been as completely demethylated as it is possible for it to be as a result solely of enzymic action. The resulting product is herein termed "a minimum methoxyl pectinic acid," but should be distinguished from heretofore known low methoxyl pectinic acids by its content of the minimum number of methoxyl groups for enzymic action, using pectase obtained from citrus peel. As the literature points out, pectinic acid at the completion of enzymic action upon the pectin still contains some methoxyl groups, since not all of the methoxyl groups can ever be removed by simply enzymic action by itself. What the literature and prior workers in the field have not appreciated, however, is that by the use of calcium carbonate to automatically maintain the proper pH conditions for enzymic action, and by the use of "pectase" derived from citrus peel, such action can be carried to completion so far as demethylation is concerned and at the same time produce a low methoxyl pectinic acid of unique physical properties from the standpoint of ease of recovery, in a pure, undegraded form, free from multi-valent metals.

In order to accomplish the recovery of such a product we have now found that the enzyme treated pectin, in whatever state or form it may be in the pectin source material must be kept in a substantially discrete suspension during the enzymic treatment and also during subsequent washing with acidified alcohol in order, respectively, to carry the enzymic action to completion and, thereafter, to remove the multi-valent metal ions and compounds, and that the resulting minimum methoxyl pectinic acid must not be filtered or compressed under such an amount of pressure as to cause the pectinic acid particles to lose their porosity (due to gas formation in their production) and hence their ability to release the multi-valent metals to the ambient acidified alcohol. Further, the pH of the acidified alcohol washes must be carried as low as 1 or lower if the multi-valent metals are to be sufficiently eliminated to produce a minimum methoxyl pectinic acid that can be rendered sufficiently unsusceptible to calcium ions or other multi-valent ions with a minimum of sodium hexametaphosphate to be capable of forming gels with the addition of such multi-valent ions, and at the same time to be capable of forming gels with or without the addition of sugar.

The rendering of our low methoxyl pectinic acid not unduly susceptible to the presence of multi-valent cations and not dependent upon them for gel formation is accomplished by incorporating with the pectinic acid a sufficient proportion of a calcium sequestering agent, such as sodium hexametaphosphate. In addition, since our minimum methoxyl pectinic acid is not soluble by itself in plain water, although it does disperse readily without clumping, we add to such dispersion an edible salt of an organic oxy acid, such as sodium or potassium citrate or tartrate, to serve both as a solubilizing agent and as a buffer against too high acidity when an edible organic acid is used to effect a gelling action.

We are able, through the use of sodium hexametaphosphate and potassium citrate, or an equivalent thereof, to prepare a standard aqueous solution of our minimum methoxyl pectinic acid. The buffering and calcium sequestering agents permit the controlled use of such standard aqueous minimum methoxyl pectinic acid solution either in the forming of acid-type gels, which are formed independently of the calcium-susceptibility of the minimum methoxyl pectinic acid at pH values less than about 4, or in forming calcium-gels entirely independently of the acid-susceptibility of the minimum methoxyl pectinic acid at pH values greater than 4. Due to its extreme calcium-susceptibility, our standard aqueous minimum methoxyl pectinic acid solution should have a pH above about 5 in order not to gel upon standing, or when kept in a refrigerator. At a pH less than about 4, our standard aqueous minimum methoxyl pectinic acid solution would solidify, since the iso-electric point of the pectinic acid is about 4.1, and since the solidified form of the aqueous solution would be objectionable from the standpoint of use, the pH should be maintained, as just stated, at around 5 or higher.

As a further discovery, we have found that in the isolation and recovery of our minimum methoxyl pectinic acid from the acidified alcohol wash, a special care must be taken in neutralizing, or partially neutralizing, the pectinic acid before filtering and drying the same. Preferably, such neutralizing is effected by the addition of an alcohol soluble monovalent alkaline substance, such as ammonia water ($NH_4OH$), to the dispersion of the discrete pectinic acid particles in the alcohol wash and by the addition of only sufficient ammonia to bring the pH of the low methoxyl pectinic acid to between 3 and 4. If the pH is less than about 3, there is a tendency for the pectinic acid to be degraded, that is, to lose some of its gelling powers during the drying operation, while if the pH is carried above about 4, the recovered pectinic acid is so water soluble that it will clump when added to water and not disperse readily.

It is therefore an important object of this invention to provide an improved method of making a minimum methoxyl pectinic acid having the particularly desirable property of being extremely calcium susceptible and yet easy to protect against calcium gel formation due to the hardness of the water used therewith, and capable, when desired, of forming calcium gels by the addition of substances that furnish multi-valent cations, such as calcium or magnesium, and also capable of forming acid-type gels, either with or without sugar, by the adjustment, in each instance, to the proper acid pH, the gels so formed being free from syneresis tendencies and being of pleasing texture whether of the calcium- or the acid-type.

It is a further object of this invention to provide a minimum methoxyl pectinic acid having novel properties rendering the same capable of making gels either with or without the use of multi-valent metallic ion-furnishing additions and either with or without sugar additions, and capable of forming reversible gels in the substantial absence of both multi-valent ions and sugar upon adjustment of the acidity to a pH of between 2.5 and 5.5, depending upon the solids content.

It is a further important object of this invention to provide a gel-forming composition containing minimum methoxyl pectinic acid and a sufficient proportion of sodium hexametaphosphate and of potassium citrate, or its equivalent, to protect the pectinic acid from unwanted susceptibility to gel formation by reason of the presence of multi-valent cations, yet leaving the pectinic acid capable of forming calcium gels if desired, and also to protect the pectinic acid from undue susceptibility to high acidity while leaving the same free to form acid gels in the presence or absence of sugar and to form reversible gels in the substantial absence of both multi-valent ions and sugar.

It is a further important object of this invention to provide improved conditions of effecting enzymic demethylation of pectin, the removal of multi-valent metals from the resulting minimum methoxyl pectinic acid and the recovery and isolation of such pectinic acid in dry particulate form in order to obtain a minimum methoxyl pectinic acid that is not substantially soluble in plain water but is easily dispersible therein to give an aqueous dispersion having a pH of between 3 and 4 and that is capable of being dissolved to form a standard aqueous minimum methoxyl pectinic acid upon the addition of a calcium sequestering agent, such as sodium hexametaphosphate, and of a solubilizing and buffering agent, such as sodium or potassium citrate, which said standard aqueous solution of minimum methoxyl pectinic acid is capable of forming gels with and without the presence of added calcium ions and with or without the addition of sugar, and of forming reversible gels with water and acid in the substantial absence of both calcium ions and sugar additions.

Other and further important objects of this invention will become apparent from the following description and appended claims.

METHOD NO. 1—PECTIN-ALUMINUM COPRECIPITATE SOURCE OF HIGH METHOXYL PECTIN

Preparation of pectin

In the method of our invention, we start with citrus fruit, which includes lemons, grapefruit, oranges, tangerines and limes. Lemons are the preferred source of pectin for our Method No. 1, going through the pectin-aluminum co-precipitate, but it will be understood that other citrus fruit may be used.

The lemons are first cut into halves and the halves then reamed to remove juice and seeds. After being macerated to remove essential oils, the peel, or albedo, is cut into pieces, or thin slices, preferably of less than ⅛ inch width, and washed with water acidified with hydrochloric acid, if necessary, to produce a pH value below 4, to remove as much of the water soluble salts, acids and the like as possible without any loss of enzymes.

After being washed, the peel is digested in an acidified aqueous solution, preferably hydrochloric acid, at a pH of between 1.75 and 2.75 and at a temperature of around 140 to 180° F. Suitable conditions for the digestion to liberate pectin are described in our Patent No. 2,173,260. After screening to remove undigested fibres and other cellulosic substances, the acid solution of pectin, containing about 0.5 to 1% of high methoxyl pectin by weight is treated with calcium or magnesium carbonate and a soluble aluminum salt to form a co-precipitate comprising a pectin-aluminum complex, as disclosed in our Patent No. 2,540,050.

Preparation of pectin-aluminum co-precipitate

In the coprecipitation step, some of the calcium carbonate used to neutralize the acidity is added directly to the acid aqueous pectin solution. In a separate batch operation the balance of the calcium carbonate is made into a slurry and added to a solution of aluminum chloride in the proper proportions to partially neutralize the acidity of the aluminum chloride solution, and the resulting solution is added to the calcium carbonate-treated pectin solution to effect the necessary conditions, including a pH of between about 3.70 and 4.50, preferably between 3.90 and 4.10 to bring about the coprecipitation of the pectin-aluminum complex. The purpose of adding some of the calcium carbonate directly to the aqueous acid pectin solution is to bring the pH of the solution to around 4.0 to 6.0 (tested after the removal of the liberated carbon dioxide), before adding the aluminum chloride solution (partially neutralized with calcium carbonate). By following this procedure, pectin and aluminum hydroxide are caused to come out of solution together as a coprecipitate upon the introduction of the aluminum chloride solution into the aqueous pectin solution and the amount of gassing, due to the formation of carbon dioxide, is more easily controlled.

A relatively low density, flocculent coprecipitate of pectin and aluminum hydroxide is immediately formed. Violent agitation of the mass is carried out to insure thorough mixing. Upon the completion of the reaction, the mother liquor tests between about 3.70 and 4.50 pH. The agitation is then slowed down and finally stopped to allow the coprecipitate to rise to the surface.

As exemplary of proportions used in effecting the coprecipitation reaction, 2000 gals. of aqueous pectin solution having a pH of 3.00 to 3.25 and a pectin concentration of 0.5% by weight, were treated with 50 lbs. of precipitated chalk ($CaCO_3$) and 26 gallons of 50 wt. percent $AlCl_3$ solution. The addition of a part of the precipitated chalk to the pectin solution brought the solution to a pH of 4.60, but after the balance of the calcium carbonate and aluminum chloride was all stirred in, the pH dropped to about 3.70.

The mother liquor is first largely drawn off from below the floating mass of coprecipitate and the remaining mass then agitated with about an equal volume of water and the combined aqueous mass then run through a reel, where the coprecipitate is further washed by spraying with water. After leaving the reel, the washed coprecipitate is ready for enzymic demethylation.

The enzyme solution that we use is one prepared from citrus peel, such as lemon peel, by the following preferred method.

*Preparation of enzyme pectase solution*

Washed comminuted lemon peel, prepared as above described, is mixed with water, ordinary salt (NaCl), sodium bicarbonate and precipitated chalk at a temperature of around 90 to 120° F. in the following proportions:

660 gallons water
330 gallons peel
100 pounds salt
10 pounds sodium bicarbonate
5 pounds chalk The amount of sodium bicarbonate added is sufficient to neutralize acidity in the peel to bring the pH to between 4 and 6, while the added chalk serves automatically to control the pH between about 6 and 7 during the several hours required to carry the enzymic reaction to completion. When the pH remains constant at about 6 without further addition of chalk, the reaction is considered completed.

The pectase solution so produced is then drained or filtered from the peel and is ready for use in the treatment of the coprecipitate. The peel separated from the pectase solution can be processed to produce a pectinic acid-hemicellulose product in accordance with the method of our application Serial No. 394,212, filed November 24, 1953. That product, referred to as protopectin, which in dry, powdered form consists of about 50% of low methoxyl pectinic acid and 50% (by weight) of hemicellulose, can be used as such, or the pectinic acid content can be put into solution and filtered or centrifuged from the fibers. The amount of pectinic acid so recovered is about one-third that of the low methoxyl pectinic acid produced by the enzymic action on the coprecipitate, using the pectase prepared in making the protopectin. This additional amount of protopectin or of recoverable pectinic acid represents a saving applicable to the cost of making the pectase and helps make our process all the more economical.

While the prior workers in the field have suggested the enzymic treatment of a pectin-aluminum complex, or coprecipitate, none prior to us, to the best of our knowledge, used an enzyme solution produced from citrus peel, and, in fact, the same type of citrus peel used in preparing the pectin for coprecipitation. We have found that the enzyme so derived from citrus peel (to which we have ascribed the generic term "pectase"), acts much differently from enzymes derived from other sources. For instance, methyl esterase, purchased on the market, gave a demethylated pectin of quite different properties, including much greater susceptibility to calcium, than the low methoxyl pectinic acid of our invention Kertesz (p. 129) recognized the apparent differences in the action of enzymes from different sources. Consequently, we prefer in our present method to use pectase within the meaning above given to that term.

*Enzymic treatment of the pectin-aluminum coprecipitate*

In the treatment of the pectin-aluminum coprecipitate with pectase, the water-washed coprecipitate is dumped into a solution of the pectase, prepared as above described, using from 1 to 3 volumes of the pectase solution for each volume of the water-washed coprecipitate. This gives a relatively dilute dispersion of the coprecipitate with the particles thereof well broken up and well dispersed in the aqueous pectase medium. The temperature of the mass during the continuance of the enzymic action is maintained at between 90 and 120° F., or at about 105° F., but any temperature from about 60° F. up to 160° F. is operative.

At the start of the enzymic action and from time to time during the continuance thereof, sufficient precipitated chalk (or other form of calcium or magnesium carbonate) is added to keep the pH between about 5.5 and 7. The action is continued until there is no further tendency of the acidity to increase upon standing, thereby indicating that the enzymic action is complete.

At completion, sufficient acid, preferably hydrochloric, is added to lower the pH to about 4 or slightly less. About 0.1% of sodium benzoate, based upon the weight of the reaction mass may then be added to preserve the mass against fermentation if it is not to be immediately further processed.

*Isolation and recovery of the low methoxyl pectinic acid*

The acid treated enzymic reaction mass is next screened or filtered, drained and washed with water to remove as much as practically possible of the mother liquor. The mother liquor, which is discarded, carries away most of the pectase and some of the multivalent cations as inorganic compounds.

The washed, enzyme-treated coprecipitate is now mixed with about 90% alcohol, preferably isopropyl, containing sufficient free acid, preferably hydrochloric acid, to bring the pH of the mass down to about 1 or less. The consistency at this point is such that the dispersion can be readily pumped, with the result that the solid particles of the pectinic acid released from the pectinic acid-aluminum complex are relatively small and well dispersed in the liquid medium. Due to dilution by the water accompanying the coprecipitate, the alcohol in the mass is at a concentration of about 40 to 45% by volume. Under these conditions the multivalent metals such as aluminum and calcium, present in the coprecipitate are readily extracted therefrom into the acid aqueous alcohol medium.

After filtering the resulting mass, the cake is charged into a body of about 90% isopropyl alcohol (unacidified), thoroughly agitated therewith and then again filtered or drained and remixed with unacidified 90% alcohol until the pH of the alcohol medium has been raised to about 2 to 2.5 pH. Mixing can be suitably effected by removing some of the alcohol and recirculating the same back into the same vessel in which the pectinic acid is being agitated in a body of such alcohol.

By way of example as to volumes of alcohol used, for each 300 pounds of final dry pectinic acid product, about 400 gallons of alcohol are used in each rinse with the equivalent of four total rinses. If the first rinse is with the acidified 40–45% alcohol and the next three rinses with unacidified 90% alcohol, they are usually sufficient to give a product that is substantially free from multivalent metals.

The final dispersion of low methoxyl pectinic acid in 90% alcohol is treated with sufficient ammonia, in the form of a water solution thereof, to bring the pH of the pectinic acid to between 3 and 4. Ammonia alone may be used for this purpose. Sodium carbonate cannot be used because of its relative insolubility in 90% alcohol. The pH should not be carried higher than 4 since the resulting minimum methoxyl pectinic acid will then be so water soluble that it will clump badly when added to water to dissolve the same therein. If the pH of the recovered pectinic acid is below about 3, there is a tendency for it to be degraded during the subsequent drying operation.

After the pH of the final alcohol dispersion has been brought to a pH of between 3 and 4, the minimum methoxyl pectinic acid is in a relatively firm, coarsely particulate form that renders it easy to filter. Filtering is carried out preferably on a gravity type of filter without the use of applied pressure. One suitable type of filter is a double-wall vessel having an upper cylindrical portion and a lower conical portion, the inner wall of which is formed of perforated stainless steel sheet having openings of less than $\frac{1}{16}$" diameter. The alcohol is allowed to filter through the perforations by gravity, to leave a matte of the pectinic acid particles against the surface of the wall. As the filtering continues, this matte continues to build up until the vessel is nearly full of the granular pectinic acid. Upon completion of the filtering, the mass is allowed to drain as free as is practical from alcohol.

The drained mass is then dumped into a vacuum drier provided with a slowly revolving agitator and dried free of alcohol under reduced pressure at a relatively low temperature below the normal boiling point of isopropyl alcohol. The dried product is then taken out of the drier, preferably in a stream of air and is passed through a centrifugal separator from which the powdered minimum methoxyl pectinic acid is recovered in a dry loosely pulverulent state. It is then passed through a grinding mill and screened to the desired degree of fineness. A perfectly white powder is thus obtained.

In place of isopropyl alcohol, ethyl, or methyl alcohol, or even acetone can be used, but isopropyl alcohol is preferred. Isopropyl alcohol in addition to being relatively cheap and easy to recover in substantially anhydrous form, is an excellent solvent at 90% concentration for the color bodies present in pectinic acid produced from a pectin-aluminum coprecipitate in the manner herein described.

MEHOD NO. 2.—ACID AQUEOUS PECTIN CONCENTRATE AS SOURCE MATERIAL

*Preparation of pectin concentrate*

The method described in the Preparation of Pectin is employed up to the obtaining of the acid solution of pectin containing about 0.5 to 1% of pectin by weight. This acid pectin extract is concentrated by evaporation of the water, preferably under vacuum, until a concentrate of between 2% and 4% by weight of high methoxyl pectin is obtained. The pH of the resulting concentrate will be about 3.00 and will conveniently have a pectin content of between 2 and 3% by weight. While the pectin can be obtained from lemon peels, as described, it is preferable to use orange peel as the source of the citrus pectin. One reason for this is that oranges are plentiful in Florida, whereas lemons are becoming scarcer in California. By using orange peel as the source of the pectin and forming a concentrate of the acid extract of pectin, this concentrate can be shipped to central plants, either nearby or at a long distance, for conversion into our minimum methoxyl pectinic acid by a method now to be described.

*Preparation of enzyme pectase solution*

The enzyme pectase solution can be prepared in the same manner as described above, but, preferably, using comminuted orange peel in place of lemon peel. Briefly, the orange peel, which has been cut to shreds and washed with a water solution of a pH less than 4.00 and greater than 3.00, is treated in a mass having the following proportions of ingredients:

1 gallon of drained orange peel
2 gallons of warm water (120° F.)
6 ounces of chalk
1 pound of salt (NaCl)

During treatment, the pH of the mass should remain above 6.00, but if the pH drops below that value, additional chalk may be added. When the pH remains constant at about 6 without further addition of chalk, the reaction is considered complete. Ordinarily, the enzymic action will be complete within two hours from the starting time.

The peel is then freed of liquid by draining and may be washed with some water to increase the yield of enzyme solution. The enzyme solution is settled or filtered clear.

*Enzymic treatment of the acid aqueous pectin concentrate*

In the treatment of the acid aqueous pectin concentrate, prepared as above described, one volume of the enzyme pectase solution, prepared as just described, is added to two volumes of the aqueous acid pectin concentrate of 2 to 3% by weight pectin content. Sufficient chalk and some sodium bicarbonate should be added to the enzyme solution at the time of adding the same to the aqueous acid pectin concentration, so that upon mixing therewith, the starting pH will be between 5.80 and 6.50. It will be recalled that the aqueous acid pectin concentrate itself has a pH of about 3.00, as prepared.

The concentrate begins to thicken almost immediately upon the start of the enzymic action and soon reaches a semi-solid stage at which it can be ground or otherwise subdivided. We have found it satisfactory, when the mass is sufficiently firm, to pass the mass through a grinder similar to a meat grinder, having holes of about one-eighth inch or less in diameter. After grinding, the ground mass, if it has a pH of below 5.80, should have its pH raised to about 6.00 by the addition of additional chalk. This is done by making the ground mass into a water slurry and adding the required amount of chalk, while stirring the slurry. The enzymic action is allowed to go to completion while in the form of a water slurry, with the pectin present in a dispersed, particulate state and freely mobile. When no further drop in the pH value occurs, which is usually after about 4 to 6 hours of enzymic action of a temperature of between 90 and 100° F., the enzymic reaction is considered complete.

At completion, sufficient acid, preferably hydrochloric, is added to lower the pH to about 3. The acid mother liquor is drained away and the material remaining is lightly pressed to remove further quantities of the mother liquor. The thus de-watered material is then subjected to the same treatment as previously described for the Isolation and Recovery of the Low Methoxyl Pectinic Acid. The low methoxyl pectinic acid so recovered, after grinding, is a perfectly white powder having an ash content not exceeding 3.00% on a dry weight basis.

METHOD NO. 3—HIGH METHOXYL PECTIN AS SOURCE MATERIAL

Preparation of high methoxyl pectin

The high methoxyl pectin used as the starting material in this third method is prepared from the pectin-aluminum coprecipitate, obtained as described under the description of Method No. 1, by liberating the pectin from the coprecipitate in the same manner as is described in our Patent No. 2,703,759, dated March 8, 1955, but the dry high methoxyl pectin, instead of being ground to between 30 and 80 mesh, as in the patent referred to, is ground to a particle size of 30 mesh or coarser, such as between 10 and 30 mesh. We have found that the use of a high methoxyl pectin of 30 mesh or coarser, as the starting material, greatly facilitates the carrying out of the enzymic action and the subsequent processing steps, such as filtering.

It will be understood that instead of starting with a high methoxyl pectin prepared from lemon peel, as in Method No. 1, we may use orange peel as the source of the high methoxyl pectin. In either case, the pectin used as the starting material should be of a particle size of 30 mesh or coarser and should be porous in character so that the enzyme solution will penetrate and wet the particles throughout. The porosity of the high methoxyl pectin particles is, of course, characteristic of our method of recovering pectin from the coprecipitate by the use of acidified alcohol.

Enzymic treatment of the high methoxyl pectin

The high methoxyl pectin, in a dry state, is added to the enzyme solution, preferably prepared from orange peel in the manner already described, and chalk (calcium carbonate) and calcium chloride are added to give a mass having the following composition:

50 gals. of enzyme solution (preferably at about 130° F.)
12 lbs. of high methoxyl pectin (30 mesh or coarser)
4 lbs. of chalk
1 quart of calcium chloride, as a 25% aqueous solution by weight.

The enzymic action is carried out as previously described at a temperature of around 100 to 120° F., keeping the mass violently agitated at the early stages of the reaction. This is necessary in order to thoroughly disperse the high methoxyl pectin. Thereafter, the mass is stirred, and any drop in pH below about 5.80 is made up by the addition of chalk, or of chalk and a small portion of sodium bicarbonate, so as to maintain the pH at about 6, or between about 6 and 7.

After the enzymic action is complete, which requires up to about 6 hours, the suspension is pumped into a porous, double-walled unit such as previously described in which the holes are sufficiently fine to prevent mechanical losses in pectin, and the pectin retained in the unit is water washed to remove excess chalk. Thereafter, the pectin is dropped into an agitator tank containing acidified 80–90% isopropyl, or other suitable alcohol, and the recovery of the minimum ethoxyl pectinic acid is carried out in the manner entirely similar to that previously described under the heading Isolation and recovery of the Low Methoxyl Pectinic Acid. The acidified aqueous alcohol washing of the minimum methoxyl pectinic acid is carried out at a sufficiently low pH, preferably as low as 0.50 pH, to bring the ash residue of the recovered pectinic acid to 3%, or less, on a dry weight basis. In actual runs, the ash content has been found to be about 1.3%, with a weight yield of 84% based upon the high methoxyl pectin used as the starting material.

In the final step, the minimum methoxyl pectinic acid is ground to the desired degree of fineness, which is preferably 80 mesh or finer.

THE MINIMUM METHOXYL PECTINIC ACID OF OUR INVENTION

The minimum methoxyl pectinic acid produced by any of the three methods just described has the property of being not appreciably soluble, by itself, in water, but being capable of ready dispersion in distilled water or in tap water containing not over 40 p. p. m. of calcium without clumping, to give a pH of between 3 and 3.5, but not over 4.

Our minimum methoxyl pectinic acid is substantially free from multi-valent metals and has an ash content of not over 4%, and, usually, not over 3%, by weight, on a dry basis (constant weight at 105° C.). It has a minimum number of methoxyl groups by reason of the enzymic action having been carried to completion with our citrus enzyme, pectase. It is a low sugar type of pectinic acid in that it will gel upon adjusting the acidity to the proper pH with or without the addition of sugar. Specifically, if gelling is effected by the addition of acid to bring about a pH at which gelling takes place below the boiling point of the aqueous solution, either in the presence or absence of sugar, the gel produced is reversible in that it can be destroyed by heating and reformed by cooling. In the case of calcium or other bivalent metal gels, if the temperature of set, using our minimum methoxyl pectinic acid, is substantially below the boiling point, such gels are also reversible, but frequently, in the case of calcium gels, the temperature of set is above, or near the boiling point, and in such cases the gels can be considered non-reversible, from any practical standpoint.

GEL STANDARDS FOR OUR MINIMUM METHOXYL PECTINIC ACID

Since ours is not a sugar-acid gel type of pectinic acid, it must be standardized by other yard sticks than the amount of sugar that it will gel. Instead, our pectinic acid is standardized in terms of the percentage of slump of the gels made therefrom with water, as measured on a standard instrument put out by California Fruit Growers Exchange and called a Ridgelimeter. When so measured, the percentage of slump indicates the acid susceptibility of the minimum methoxyl pectinic acid. A separate test is carried out to determine the calcium susceptibility of the minimum methoxyl pectinic acid, and will be described separately hereinafter.

In order to carry out the acid susceptibility test, a standard minimum methoxyl pectinic acid mixture is prepared, using sodium hexametaphosphate as the calcium sequestering agent and potassium citrate as the solubilizing and buffering agent, and including anhydrous dextrose, or other substantially inert, water-soluble material as the diluent to bring the mixture up to a total of 100 parts by weight, or 100% by weight. The following composition is termed our standard minimum methoxyl pectinic acid dry mixture:

| | Percent |
|---|---|
| Pure minimum methoxyl pectinic acid | 10.0 |
| Potassium citrate | 8.5 |
| Sodium hexametaphosphate | 6.5 |
| Anhydrous dextrose | 75.0 |
| | 100.0 |

In order to test the above standard dry mixture, six ounces, or 170 grams, of this dry mixture is dissolved in tap water (about 36 fluid oz.) in order to make up a standard aqueous solution of the minimum methoxyl pectinic acid of 40 fluid oz., or 1120 cc. This aqueous solution is hereinafter sometimes referred to as our standard liquid pectin, and it is this solution that is used in establishing the slump test standards by the use of the Ridgelimeter.

One pint of the standard liquid pectin having the composition above given is heated to the boil, maintaining a constant weight by the addition of water, if necessary, and the resulting boiling pectin solution is then poured into two jelly glasses (standard 6 oz. glass jars), one containing 10 cc. and the other containing 12 cc. of 50 wt. % citric acid solution. The balance of the boiling liquid pectin is poured into a glass not containing any acid.

The glasses are prepared in such a way that shrinkage of the solution upon cooling is possible, yet a glass-full of gel results. This is accomplished by winding a length of a pressure sensitive transparent tape about the top of each glass to build up the height thereof, before pouring the portions of gel solution into the glasses. Then, after the gels have set, the tapes are removed and the gel in each glass trimmed off even with the rim thereof by means of a wire trimmer. Thus, when the gels are turned out, they are the exact height initially of the glasses. The glasses are allowed to stand over night, or for twelve hours, at about room temperature (67° F.). The gels so produced in the two glasses containing acid are turned out onto plane surfaces and are measured on the Ridgelimeter exactly 30 seconds after being turned out.

With a minimum methoxyl pectinic acid of standard strength, approximately the following readings will be obtained:

| Glasses | cc. 50% citric acid solution | Ridgelimeter Reading, degrees | pH Reading |
| --- | --- | --- | --- |
| No. 1 | 10 | 12 | 3.35 |
| No. 2 | 12 | 9 | 3.20 |

The pH of the standard liquid pectin is initially between 4.90 and 5.30. With the pH of the standard liquid pectin between these limits, the additions to the jelly glasses of 10 cc. and 12 cc., respectively, of a 50% citric acid solution result in the pH readings above indicated of 3.35 and 3.20. In general, an acid-type gel can be prepared by the use of our minimum methoxyl pectinic acid if the pH is adjusted to between 2.75 and 3.50, but in standardizing our minimum methoxyl pectinic acid mixture we prefer to adjust the pH readings to substantially those given in the above table so as to eliminate variables and thereby obtain consistently comparable slump readings on the Ridgelimeter.

In testing a minimum methoxyl pectinic acid of unknown quality against the standard minimum methoxyl pectinic acid dry mixture, if the slump readings on the Ridgelimeter are numerically higher, thereby indicating a gel of less firmness, the minimum methoxyl pectinic acid content is increased, as compared with the standard dry mixture, and the dextrose content is correspondingly decreased. The increases in the minimum methoxyl pectinic acid content in the dry mix is conveniently made in increments of 10% until gels produced by the standard procedure above outlined are in all respects comparable with the standard gels. For instance, if 10% more of the minimum methoxyl pectinic acid were included in the dry mix, the percentages would be as follows:

| | Percent |
| --- | --- |
| Pure minimum methoxyl pectinic acid | 11 |
| Potassium citrate | 8.5 |
| Powdered sodium hexametaphosphate | 6.5 |
| Anhydrous dextrose | 74.0 |
| | 100.0 |

Gel tests in accordance with the standard procedure above outlined would then be carried out and a comparison made with the slump and pH readings given above in the standard test. Additional comparative tests with the standard would be made, if necessary, with further 10% increases in the minimum methoxyl pectinic acid content of the dry mix until a mix was obtained that would substantially equal the standard acid-type gel slump test readings on the Ridgelimeter. In a similar way, if the minimum methoxyl pectinic acid undergoing tests for acid-type gel strength produced a gel, using the standard procedure, that was substantially firmer than the standard gel, that is, showed less slump on the Ridgelimeter, the minimum methoxyl pectinic acid content would be reduced in 10% increments until gels were produced matching the standard gels.

CALCIUM SUSCEPTIBILITY GEL STANDARDS FOR MINIMUM METHOXYL PECTINIC ACID

In determining the calcium susceptibility of our minimum methoxyl pectinic acid we employ two tests, one of which involves the preparation of a custard with evaporated milk as the source of calcium, and the other of which involves the preparation of a calcium gel with an artificial sweetening agent containing a definite amount of calcium for the formation of a calcium gel.

In the making of a custard with evaporated milk (unsweetened), water and eggs, we also use an artificial sweetening agent having a definite calcium content, but the evaporated milk is relied upon to furnish the necessary amount of calcium to form the calcium type gel. Our artificial sweetening agent may be the same composition in both tests and preferably has the following ingredients in the indicated proportions by weight:

| | Percent |
| --- | --- |
| Calcium cyclamate | 8 |
| Calcium saccharin | 2 |
| Water | 90 |

To this aqueous solution of calcium cyclamate and calcium saccharin may be added small but effective amounts of benzoic acid and methyl parabenzoic acid as preservatives. The pH of our artificial sweetening solution is less than 4.00 but greater than 3.50, due to the acidity imparted to it by the benzoic acid. The artificial sweetening solution keeps better at this pH value of between 3.50 and 4.00.

In making a custard, separate mixes are prepared as follows:

MIX A 2 eggs
½ cup standard liquid pectin

The standard liquid pectin is the same as that heretofore described and is mixed with the two whole eggs and the mixture beaten for one minute in a large mixing bowl, using a power mixer.

MIX B 1 large can evaporated milk (unsweetened)
2 cups water
2 teaspoonsful vanilla extract
2 teaspoonsful standard artificial sweetening solution The ingredients of Mix B are put into a two-quart kettle, heated to the boil with constant stirring and the boiling mixture then gradually added to the pectin-egg mixture, Mix A, with vigorous stirring. The temperature of the final mixture is somewhat above about 130° F., at which temperature the albumin of the egg is sufficiently denatured to form a soft, smooth coagulation. The final mixture is poured into suitable containers which are allowed to cool gradually at room temperature.

If the minimum methoxyl pectinic acid is up to standard, the custard, when set, will cut smoothly with a spoon and retain spoon shape when a spoonful thereof is inverted onto the top of the custard. If the custard is not sufficiently firm to retain the shape of the spoon when inverted as described, the percentage of the minimum methoxyl pectinic acid in the liquid pectin is increased by 10% increments, as previously described, until the desired standard firmness and texture of the custard made therewith are obtained.

In the preparation of a calcium gel, using our artificial sweetening solution as the source of calcium, a water packed cocktail fruit is mixed with our artificial sweetening solution in the following proportions:

1 16 oz. can cocktail fruit (water packed)
1 teaspoon artificial sweetening solution The artificial sweetening solution has the same composition as that given previously. Since the calcium content is about 10% of the combined weights of calcium cyclamate and calcium saccharin, the solution contains 1% by weight, approximately, of calcium. Consequently, one teaspoonful, which is equivalent to about 5 cc., contains 50 mg. of calcium.

The cocktail fruit and artificial sweetening solution are first well mixed, and then one-quarter cup (2 fluid ounces) of our standard liquid pectin are stirred into the artificially sweetened fruit. In less than ten minutes, the mass will gel to a slight extent, and within one hour it will have a very definite gelatin-textured set. Upon refrigeration, the gel can be turned out as a mold from various size containers, such as four to six ounce dishes.

In the above test with artificial sweetening solution, the one-quarter cup of our standard liquid pectin is equivalent to about 0.34 gram of minimum methoxyl pectinic acid (dry). If the minimum methoxyl pectinic acid has the standard degree of calcium susceptibility, then under the conditions of this test a highly satisfactory, gelatin-textured set will take place at room temperature within one hour after stirring the liquid pectin into the artificially sweetened fruit. If, instead of using one-quarter cup, one-third cup of liquid pectin is added, a softer set will result at room temperature, and if one-half cup of liquid pectin is added, refrigeration will be necessary to attain a gelatin-like set. This simply means that when larger amounts of the minimum methoxyl pectinic acid solution are used, the calcium is further suppressed due to the increased calcium sequestering effect of the sodium hexametaphosphate associated in corresponding proportions with the minimum methoxyl pectinic acid in the liquid pectin. Thus, the set obtained in the resulting calcium gel is weaker, or softer, in inverse ratio to the amount of minimum methoxyl pectin employed in excess of that amount of the pectinic acid just required to give a gelatin-textured set.

Expressed differently, the potassium citrate and sodium hexametaphosphate in our standard minimum methoxyl pectinic acid solution is so balanced with respect to calcium ions available that one teaspoonful, or 5 cc., of our artificial sweetening solution (equivalent to 50 mg. of calcium) will make a good gel with 16 oz. of water packed fruit and two fluid ounces of our standard liquid pectin (equivalent to 0.34 gram of minimum methoxyl pectinic acid). The above described standard procedures for testing our minimum methoxyl pectinic acid for acid susceptibility and for calcium susceptibility are generally applicable regardless of whether the minimum methoxyl pectinic acid is formed by one or another of the three methods heretofore described. It may be observed, however, that when the minimum methoxyl pectinic acid is prepared by Method No. 3, that is, by enzymic action of a high methoxyl pectin as the starting material, there is a close relationship between the stength of the minimum methoxyl pectinic acid, both as to acid susceptibility and as to calcium susceptibility, with the sugar grade of the starting pectin. For instance, if the starting high methoxyl pectin is 200 grade, the minimum methoxyl pectinic acid prepared therefrom will be 10% weaker than when prepared from 220 grade high methoxyl pectin.

SUGAR-TYPE GELS

A low sugar gel may be made of the following composition:

2 cups Concorn grape juice (16 fl. oz.) with 16% soluble solids content
8 fl. oz. standard liquid pectin
4 fl. oz. lemon juice The juice is placed in a kettle and then the standard liquid pectin is added and the mass heated to the boiling point. The kettle is then removed from the stove, the mass skimmed and the lemon juice stirred in. After pouring the final mixture into glasses, the latter are set aside to cool. The gel texture is perfect. This gel will have a 17% soluble solids content and a pH of about 3.00 to 3.10.

A cup-for-cup jam can be prepared from the following:

1 16 oz. can peaches (sliced in heavy syrup)
1 cup sugar
1 cup standard liquid pectin
½ cup lemon juice The mixture is heated to 110° F. and allowed to cool. The total solids content is about 33% and the pH about 3.35.

Since there is no loss due to boiling we can produce in a similar manner, but using two cups of sugar 33 oz. of jam with 50% soluble solids and having a pH between 3.50–3.70.

From the foregoing it will be appreciated that we have provided a very unusual and novel type of gel composition. Our minimum methoxyl content pectinic acid is itself believed to be new. Instead of requiring the presence of bivalent cations, such as calcium or magnesium, our minimum methoxyl pectinic acid can be used to form acid-type gels with water alone by proper adjustment of the pH, and such gels, if formed at a temperature of set below the boiling point, are reversible in that upon being heated to a temperature above their temperature of set, they lose their set, only to regain their gel consistency upon cooling again to below the temperature of set. This same phenomenon is observed when sugar is present, provided the temperature of set is below the boiling point of the sugar solution.

The term "minimum methoxyl pectinic acid," as used herein and in the claims, distinguishes our product from heretofore known low methoxy pectinic acids by designating a pectinic acid having the minimum number of methoxyl groups that can be obtained solely as a result of enzymic action where the pectin is one obtained from citrus peel and the enzyme used is pectase, also from citrus peel, and enzymic action is carried out under pH conditions initiated and maintained essentially because of the presence in the re-action mass of an excess of a metal carbonate selected from the group consisting of calcium and magnesium carbonates. Under these conditions there appears to be no degrading of the pectinic acid and therefore no loss of its gelling powers. And surprisingly, unlike heretofore known low methoxyl pectinic acids, ours replaces no calcium or other multi-valent cations to form a gel. The term "gel" is used herein instead of jelly because the latter term is restricted to a gel requiring at least 65% sugar in the final composition to effect a set upon adjustment of its acidity to the proper pH.

While our minimum methoxyl pectinic acid can be used to form high as well as low sugar "jellies," and is intended for such purposes, it can also be used with fruit or other flavoring substances in the substantial absence of any sugar at all to give masses of any degree of viscosity up to firm gels of pleasing texture and also to give jelly or jam-like products of any desired consistency or viscosity merely by proper adjustment of the pH in relation to the soluble solids content of the mass to be prepared.

In addition, our minimum methoxyl content pectinic acid can be used to form calcium gels, custards, aspics and the like.

It will be understood that modifications and variations may be effected without departing from the scope of the novel concepts of the present invention.

We claim as our invention:

1. A minimum methoxyl pectinic acid obtained from pectin derived from citrus peel by the enzymic action on said pectin of a citrus peel-derived pectase carried to completion in the presence of an excess of a carbonate selected from the group consisting of calcium and magnesium carbonates, said pectinic acid being incompletely soluble in plain water but easily dispersible without clumping in water containing not over 40 p. p. m. of calcium to give a pH of between 3 and 4 and being completely soluble when 170 grams of a dry admixture thereof in the proportions of 10 parts by weight of said minimum methoxyl pectinic acid, 8.5 parts by weight of potassium citrate, 6.5 parts by weight of sodium hexametaphosphate and 75 parts by weight of dextrose are dissolved in water to give about 1120 milliliters of solution, the solution so formed being capable of forming a reversible gel upon the adjustment of said solution to a pH of between 2.75 and 3.50 in the substantial absence of both bi-valent metallic ions and sugar.

2. A standardized, dry, pulverulent, white pectinic acid composition consisting essentially of a minimum methoxyl pectinic acid obtained from pectin derived from citrus peel by the enzymic action thereon of a citrus peel-derived pectase carried to completion in the presence of an excess of a carbonate selected from the group consisting of calcium and magnesium carbonates, an edible alkali metal salt of an oxy organic acid as a solubilizing and buffering agent, sodium hexametaphosphate as a calcium sequestering agent, and an amount of a substantially inert water soluble material in substantially the proportions given of the respective equivalent specific ingredients, to wit:

| | G. |
|---|---|
| Minimum methoxyl pectinic acid | 10.0 |
| Potassium citrate | 8.5 |
| Sodium hexametaphosphate | 6.5 |
| Dextrose | 75.0 | said composition when tested as follows meeting the gel standard below set forth:

170 g. of said composition are dispersed in water to give 1120 ml. of solution upon being heated to the boil to effect dissolution; the resulting solution is poured into 6 oz. standard glasses containing respectively, 10 ml. and 12 ml. of a 50% aqueous solution of citric acid by weight and allowed to stand for 12 hours at about 67° F.; the resulting gels are turned out onto plane surfaces and meet the following tests:

| Acid Addition | pH | Ridgelimeter Reading, degrees |
|---|---|---|
| 10 ml. of 50% citric | 3.35 | 12 |
| 12 ml. of 50% citric | 3.20 | 9 |

3. A standardized aqueous solution of a pectinic acid composition, said composition consisting essentially of a minimum methoxyl pectinic acid obtained from a citrus pectin by the action thereon of citrus peel-derived pectase carried to completion in the presence of a metal carbonate selected from the group consisting of calcium and magnesium carbonates, an edible alkali metal salt of an oxy organic acid as a solubilizing and buffering agent, a calcium sequestering agent and a substantially inert water soluble material, said composition being the equivalent of an admixture of the following ingredients in the specified proportions:

| | G. |
|---|---|
| Minimum methoxyl pectinic acid | 10.0 |
| Potassium citrate | 8.5 |
| Sodium hexametaphosphate | 6.5 |
| Dextrose | 75.0 | a solution of said composition in water constituting said standardized aqueous solution when tested as follows and meeting the gel standard below set forth:

170 g. of said composition are dispersed in water to give about 1120 ml. of solution when the dispersion is heated to effect complete dissolution thereof; said solution is then poured into 6 oz. standard glasses containing, respectively, 10 ml. and 12 ml. of a 50 wt. % aqueous solution of citric acid and allowed to stand at about 67° F. until gelled; the respective gels are turned out onto plane surfaces and meet the following tests:

| Acid Addition | pH | Ridgelimeter Reading, degrees |
|---|---|---|
| 10 ml. of 50% citric | 3.35 | 12 |
| 12 ml. of 50% citric | 3.20 | 9 |

4. A reversible gel formed with the equivalent of the standard aqueous set forth in claim 3.

5. In the method of making a minimum methoxyl pectinic acid, the steps which comprise providing an aqueous dispersion of a citrus pectin, subjecting said pectin to the enzymic action of a citrus peel-derived pectase in the presence of an excess of a metal carbonate selected from the group consisting of calcium and magnesium carbonate, continuing the enzymic action until there is no further appreciable tendency of the acidity of said dispersion to increase on standing, at that point terminating said enzymic action to obtain a minimum methoxyl pectinic acid and recovering said minimum methoxyl pectinic acid in dry particulate form.

6. The method of making a minimum methoxyl pectinic acid, which comprises subjecting a citrus pectin in an aqueous dispersion to the enzymic action of a citrus peel-derived pectase in the presence of a metal carbonate selected from the group consisting of calcium and magnesium carbonates, continuing the enzymic action until there is no further appreciable tendency of the acidity of said dispersion to increase on standing, at that point terminating said enzymic action to obtain a minimum methoxyl pectinic acid, washing said pectinic acid first with an acidified aqueous alcohol to remove substantially all multivalent metals and then with unacidified concentrated alcohol to form a final dispersion of minimum methoxyl pectinic acid in alcohol, adjusting the pH of the final dispersion to between 3 and 4 and recovering therefrom the minimum methoxyl pectinic acid in dry particulate form having an ash content not over 4% by weight.

7. In the method of making a minimum methoxyl pectinic acid, the steps which comprise providing a concentrated aqueous acid extract of a citrus pectin, adjusting the pH of said concentrate to between 5.5 and 7.0 subjecting said pectin in such concentrate to the enzymic action of a citrus peel-derived pectase in the presence of an excess of a metal carbonate selected from the group consisting of calcium and magnesium carbonates, maintaining said pectin in a dispersed discrete form and continuing the enzymic action until there is no further tendency of the acidity of said dispersion to increase on standing, at that point terminating said enzymic action to obtain a minimum methoxyl pectinic acid, washing said pectinic acid first with an acidified aqueous alcohol to remove substantially all multi-valent metals and then with unacidified concentrated alcohol to form a final dispersion of minimum methoxyl pectinic acid in alcohol, adjusting the pH of the final dispersion to between 3 and 4 and recovering the minimum methoxyl pectinic acid in dry particulate form having an ash content not over about 3% by weight.

8. In the method of making a minimum methoxyl pectinic acid, the steps which comprise providing a concentrated aqueous acid extract of a citrus pectin containing about 2 to 3% pectin by weight, subjecting said pectin in dispersion to the enzymic action of a citrus peel-derived pectase in the presence of an excess of a metal carbonate selected from the group consisting of calcium and magnesium carbonates, continuing the enzymic action until said dispersion sets into a semi-solid mass, comminuting said mass to form an aqueous dispersion of particulate pectin material, adjusting said dispersion to a pH of from about 5.5 to 7.0 in the presence of an excess of said metal carbonate until there is no further tendency of the acidity of said dispersion to increase appreciably on standing, at that point terminating said enzymic action to obtain a minimum methoxyl pectinic acid, washing said pectinic acid first with an acidified aqueous alcohol to remove substantially all multivalent metals and then with unacidified concentrated alcohol to form a final dispersion of minimum methoxyl pectinic acid in alcohol, adjusting the pH of the final dispersion to between 3 and 4 and recovering the minimum methoxyl pectinic acid in dry particulate form having an ash content not over about 3% by weight.

9. In the method of making a minimum methoxyl pectinic acid, the steps which comprise providing a concentrated aqueous acid extract of a high methoxyl pectin containing about 2 to 3% pectin by weight, subjecting said pectin to the enzymic action of a citrus peel-derived pectase in the presence of an excess of a metal carbonate selected from calcium and magnesium carbonates, continuing the enzymic action until said dispersion sets into a semi-solid mass, comminuting said mass, dispersing said a semi-solid mass in a water slurry, adjusting said slurry to a pH of from about 5.5 to 7.0 in the presence of an excess of said metal carbonate, continuing said enzymic action until there is no further tendency of the acidity of said dispersion to increase appreciably on standing, at that point terminating said enzymic action to obtain a minimum methoxyl pectinic acid, washing said pectinic acid first with an aqueous acid alcohol solution in which the selected metal carbonate is soluble until substantially all multi-valent metals have been removed and finally with an unacidified concentrated alcohol to form a dispersion of the minimum methoxyl pectinic acid in alcohol, adjusting the pH of the final dispersion to between 3 and 4 and recovering the minimum methoxyl pectinic acid in dry particulate form.

10. In a method of making a minimum methoxyl pectinic acid, the steps which comprise providing a concentrated aqueous acid extract of a citrus-derived pectin containing about 2 to 3% of pectin by weight, subjecting said pectin to the enzymic action of a citrus peel-derived pectase in the presence of an excess of a metal carbonate selected from the group consisting of calcium and magnesium carbonate, continuing the enzymic action until said dispersion sets into a semi-solid mass, comminuting said mass, dispersing said comminuted mass in an aqueous slurry that can be readily stirred, stirring said slurry to maintain thorough contact of the dispersed particulate material with the pectase, adjusting said aqueous slurry to a pH of from about 5.5 to 7.0 in the presence of an excess of said metal carbonate, continuing said enzymic action on the pectin in said slurry until there is no further tendency of the acidity of said dispersion to increase appreciably on standing, at that point terminating said enzymic action to obtain a minimum methoxyl pectinic acid, washing said pectinic acid first with an aqueous acid alcohol solution to remove substantially all multi-valent metals and then with unacidified concentrated alcohol to form a final dispersion of the minimum methoxyl pectinic acid in alcohol, the entire method being carried out without compacting the pectinic acid under sufficient pressure to destroy the porosity of the pectinic acid particles brought about as a result of the gas formed in the acidified alcohol washing steps, whereby the recovered product has a porous structure facilitating the dispersion and dissolution thereof, adjusting the pH of the final dispersion to between 3 and 4 and recovering the minimum methoxyl pectinic acid in dry particulate form.

11. In the method of making a minimum methoxyl pectinic acid, the steps which comprise providing a concentrated aqueous acid extract of pectin of high methoxyl content from citrus peel, subjecting said pectin at a pH of from about 5.5 to 7.0 to the enzymic action of a citrus peel-derived pectase, the pH being controlled largely by the presence of a metal carbonate selected from the group consisting of calcium and magnesium carbonates, continuing said enzymic action until a relatively firm mass is formed, comminuting said mass, subjecting said comminuted mass in a discrete particle dispersion thereof to the continued action of said pectase in the presence of an excess of said metal carbonate until there is no appreciable tendency of the acidity of said dispersion to increase, stopping the enzymic action at that point to obtain a minimum methoxyl pectinic acid and recovering said minimum methoxyl pectinic acid in dry particulate form having an ash content of not over 4% by weight and capable in water dispersion of giving a pH of between about 3 and 4.

12. The method of making a minimum methoxyl pectinic acid, which comprises subjecting a high methoxyl citrus pectin of 30 mesh particle size and coarser in an aqueous dispersion to the enzymic action of pectase derived from citrus peel in the presence of an excess of a metal carbonate selected from the group consisting of calcium and magnesium carbonates, continuing the enzymic action until there is no further tendency of the acidity of said dispersion to increase on standing, at that point terminating said enzymic action to obtain a minimum methoxyl pectic acid, washing such pectinic acid first with an acidified aqueous alcohol to remove substantially all multi-valent metals and then with unacidified concentrated alcohol to form a final dispersion of minimum methoxyl pectinic acid in alcohol, the entire method being carried out without compacting the pectinic acid under sufficient pressure to destroy the porosity of the pectinic acid particles brought about as a result of the gas formed in the acidified alcohol washing step, whereby the recovered product has a porous structure facilitating the dispersion and dissolution thereof, adjusting the pH of the final dispersion to between 3 and 4 and recovering the minimum methoxyl pectinic acid in dry particulate form having an ash content not over about 3% by weight.

13. The method of making a minimum methoxyl pectinic acid, which comprises subjecting a pectin-aluminum hydroxide coprecipitate to the enzymic action of pectase derived from citrus peel in an aqueous dispersion in the presence of an excess of a metal carbonate selected from the group consisting of calcium and magnesium carbonate, continuing the enzymic action until there is no further tendency of the acidity of said dispersion to increase on standing, at that point terminating acid enzymic action to obtain a minimum methoxyl content pectinic acid, washing such pectinic acid first with an acidified aqueous alcohol to remove substantially all multi-valent metals and then with unacidified concentrated alcohol to form a final dispersion of minimum methoxyl pectinic acid in alcohol, adjusting the pH of the final dispersion between 3 and 4 and recovering the minimum methoxyl pectinic acid in dry particulate form.

14. The method of making a minimum methoxyl pectinic acid, which comprises subjecting a pectin-aluminum hydroxide coprecipitate to the enzymic action of pectase derived from citrus peel in an aqueous dispersion in the presence of an excess of a metal carbonate selected from the group consisting of calcium and magnesium carbonate, continuing the enzymic action until there is no further tendency of the acidity of said dispersion to increase on standing, at that point terminating said enzymic action to obtain a minimum methoxyl content pectinic acid, washing such pectinic acid first with an acidified aqueous alcohol to remove substantially all multi-valent metals and then with unacidified concentrated alcohol to form a final dispersion of minimum methoxyl pectinic acid in alcohol, the entire method being carried out without compacting the pectinic acid been removed therefrom, the washing said pectinic acid under sufficient pressure to destroy the porosity of the pectinic acid particles brought about as a result of the gas formed in the coprecipitation and acidified alcohol washing steps, whereby the recovered product has a porous structure facilitating the dispersion and dissolution thereof, adjusting the pH of the final dispersion to between 3 and 4 and recovering the minimum methoxyl pectinic acid in dry particulate form.

15. The method of making a minimum methoxyl content pectinic acid, which comprises subjecting a pectin-aluminum hydroxide coprecipitate to the enzymic action of pectase derived from citrus peel in an aqueous dispersion of from 1 to 3 volumes of pectase solution to 1 volume of said coprecipitate at a pH of between 6 and 7 initiated and maintained automatically by an excess of a metal carbonate selected from the group consisting of calcium and magnesium carbonates, containuing the enzymic action until there is no further tendency of the acidity of said dispersion to increase on standing, at that point terminating said enzymic action to obtain a minimum methoxyl content pectinic acid, separating the resulting pectinic acid-aluminum product from its mother liquor, washing the thus separated product first with an acidified aqueous isopropyl alcohol solution of a pH as low as 1 unit substantially all multi-valent metals have been removed therefrom, then washing said pectinic acid with concentrated isopropyl alcohol to remove color bodies therefrom and produce an easily filterable, relatively porous and firm granular pectinic acid, adjusting the pH of said alcohol washed pectinic acid to between 3 and 4, filtering the same from the alcohol, drying the resulting pectinic acid under reduced pressure at temperatures sufficient to drive off the adhering alcohol and recovering a minimum methoxyl pectinic acid in finely divided pulverulent state that is not completely soluble in plain water but is easily dispersed therein to give a pH of from 3 to 4.

16. The method as defined in claim 15 in which enzymic action is carried out on the pectin-aluminum coprecipitate while the latter is in a well dispersed discrete form in the aqueous pectase dispersion and the enzyme reacted product obtained therefrom is subsequently subjected to gravity pressures only so as to prevent loss of porosity in the finished minimum methoxyl content pectinic acid.

References Cited in the file of this patent

UNITED STATES PATENTS

| | | |
|---|---|---|
| 1,513,615 | Leo | Oct. 28, 1924 |
| 1,997,616 | Wallerstein | Apr. 16, 1935 |
| 2,503,258 | Graham et al. | Apr. 11, 1950 |
| 2,540,050 | Leo et al. | Jan. 30, 1951 |